United States Patent [19]

Takeuchi

[11] 4,320,624
[45] Mar. 23, 1982

[54] MASTER CYLINDER

[75] Inventor: Hiroo Takeuchi, Ueda, Japan

[73] Assignee: Nissin Kogyo Kabushiki Kaisha, Ueda, Japan

[21] Appl. No.: 133,399

[22] Filed: Mar. 24, 1980

[30] Foreign Application Priority Data

Mar. 28, 1979 [JP] Japan .................. 54/36667

[51] Int. Cl.$^3$ .............................................. B60T 11/26
[52] U.S. Cl. ...................................... 60/588; 92/162 P
[58] Field of Search ..................... 60/585, 588; 92/159, 92/175, 162 P

[56] References Cited

U.S. PATENT DOCUMENTS

| | | | |
|---|---|---|---|
| 2,160,075 | 5/1939 | LaBrie | 60/588 |
| 2,192,012 | 2/1940 | LaBrie | 60/588 |
| 3,059,435 | 10/1962 | Rusconi | 60/588 |
| 3,122,045 | 2/1964 | Zilberfarb | 92/162 R |
| 3,178,890 | 4/1965 | Wallace | 60/588 |
| 4,048,908 | 9/1977 | Urquhart | 92/159 |

Primary Examiner—Abraham Hershkovitz
Attorney, Agent, or Firm—Armstrong, Nikaido, Marmelstein & Kubovcik

[57] ABSTRACT

A master cylinder for actuating a hydraulic cylinder for a hydraulic brake or clutch. The master cylinder includes a cylinder body having a cylinder bore defined therein. The cylinder bore is in communication with an oil tank by way of a supply port and a relief port formed through the wall of the cylinder bore in axially spaced relation from each other. A piston is slidably received in the cylinder bore to define a hydraulic chamber forwardly thereof and comprises a pair of forward and rear piston portions axially spaced apart from each other with an annular seal member disposed therebetween. A cup support is integrally formed with the forward piston portion forwardly thereof and has a radially outer peripheral surface facing the inner peripheral surface of the cylinder bore with an annular clearance formed therebetween. Between the cup support and the forward piston portion there is defined an annular passage in communication with a communication passage which is formed in the outer peripheral surface of the forward piston portion and communicates with the supply port. A resilient piston cup is directly carried on the forward face of the cup support for controlling communication between the relief port and the hydraulic chamber in accordance with the axial sliding movement of the piston in the cylinder bore.

3 Claims, 4 Drawing Figures

MASTER CYLINDER

BACKGROUND OF THE INVENTION

1. Field of the Invention

The present invention relates to a master cylinder for actuating a hydraulic cylinder for a hydraulic brake or clutch.

2. Description of the Prior Art

As shown in FIG. 1, a conventional type of master cylinder comprises a cylinder body having a cylinder bore 3 in communication with an oil tank 2 through a relief port 7 and a supply port 8 which are formed through the wall of the cylinder body in axially spaced relation with each other, and a piston 4 slidably recieved in the cylinder bore 3 to define therein at its forward end a hydraulic chamber 6 which is in communication with an output port 5. The piston 4 has a pair of forward and rear piston portions 10, 11 axially spaced from each other and an annular groove portion 9 formed therebetween, the annular groove portion having an axial width larger than the sliding stroke of the piston 4. The annular groove portion 9 is normally in communication with the oil tank 2 through the supply port 8. The forward piston portion 10 has a plurality of through apertures 12 axially formed therethrough to provide a communication between the annular groove portion 9 and the hydraulic chamber 6. A piston cup 13 is disposed in the hydraulic chamber 6 and urged under the action of a return spring 15 in a rearward direction toward the forward piston portion 10 with a spacer 14 of a resilient sheet material interposed therebetween. The return spring 15 also serves to urge the piston 4 as a whole in the backward direction.

In FIG. 1, reference numerals 16 and 17 designate a stop ring and a dust boot, respectively.

In operation, the piston 4 is forced forward, as shown by the arrow, through an operating lever not shown to move the piston cup 13 forwardly of the relief port 7 so that working oil within the hydraulic chamber 6 is pressurized to actuate a hydraulic cylinder such as a brake connected to the output port 5. When the operating force of the operating lever is released, the piston 4 is retracted by the spring force of the return spring 15 and as a result, the outer peripheral portion of the piston cup 13 is flexed forwardly towards the hydraulic chamber 6 due to a pressure difference created between the hydraulic chamber 6 and the annular groove portion 9 to form a small clearance around the outer periphery and at the same time the spacer 14 is deformed so as to open the through apertures 12. Thus, oil stored in the oil tank 2 is introduced into the hydraulic chamber 6 through the supply port 8, the annular groove portion 9, the through apertures 12 and the aforesaid small clearance to supplement a reduced or consumed portion of working oil within the hydraulic chamber 6.

In this way, the spacer 14 is provided to prevent the piston cup 13 from being damaged as it is forced into the through apertures 12 when the pressure in the hydraulic chamber 6 increases.

As described above, in the conventional master cylinder, the through apertures 12 and the spacer 14 are inevitably required to supply working oil into the hydraulic chamber 6 and to protect the piston cup 13, but it is relatively cumbersome and time-consuming to fabricate these elements.

SUMMARY OF THE INVENTION

It is therefore an object of the present invention to provide a simple and effective master cylinder which is free from any inconvenience without employing any spacer and through passages in a piston as in the aforementioned prior art.

Other objects and features of the invention will appear in the following detailed description of the invention when taken in conjunction with the accompanying drawings which illustrate a few presently preferred embodiments.

DESCRIPTION OF THE PREFERRED EMBODIMENTS

Figure 1:
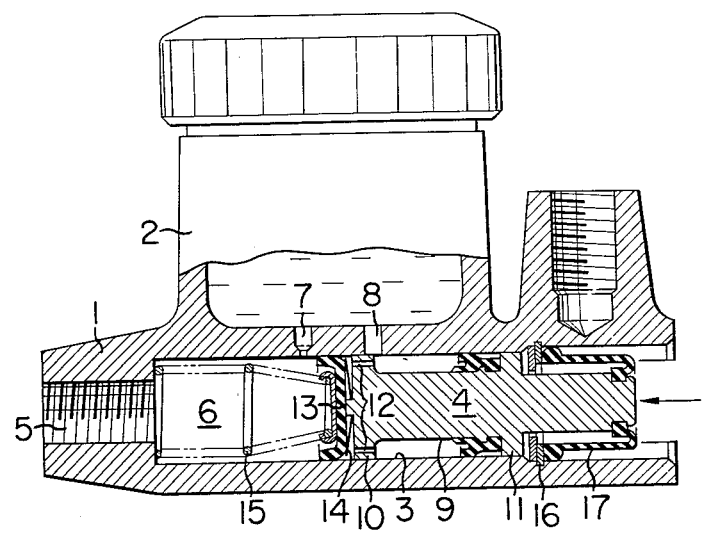
FIG. 1 is a longitudinal sectional side view of a conventional master cylinder.
Figure 2:
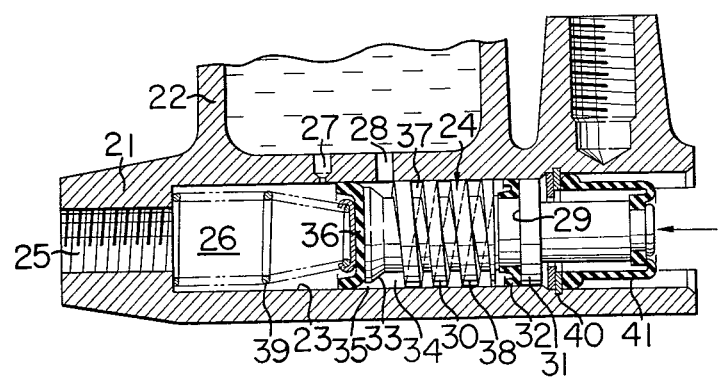
FIG. 2 is a longitudinal sectional side view showing an essential portion of a first embodiment of a master cylinder in accordance with the present invention.

Referring now to FIG. 2, which shows a first embodiment of the present invention, likewise the prior art shown in FIG. 1, a cylinder body 21 includes an oil tank 22, a cylinder bore 23, an output port 25, a relief port 27 and a supply port 28, the cylinder bore 23 slidably receiving therein a piston 24 which defines therein a hydraulic chamber 26.

The piston 24 comprises a forward piston portion 30 having a large axial width and a rear piston portion 31 having a small axial width with an annular groove 29 formed therebetween, the annular groove 29 receiving therein an annular seal member 32 for preventing leakage of oil passing through the outer periphery of the rear piston portion 31.

The forward piston portion 30 is integrally projectingly formed at its front surface with a frustoconical cup support 33 whose diameter increases forwardly or in the direction towards the hydraulic chamber 26, and an annular oil passage 34 is formed between the cup support 33 and the forward piston portion 30 and an annular clearance 35 is formed between the forward end peripheral edge of the cup support 33 and the inner peripheral surface of the cylinder bore 23. By forming the cup support 33 into a frustoconical configuration whose diameter increases towards the hydraulic chamber 26 as previously described, the pressure-resisting strength of the cup support 33 is not impaired and a flow resistance of the annular clearance 35 can be decreased.

A piston cup 36 formed of a resilient material is directly supported on the front surface of the cup support 33. The piston cup 36 takes the form of a frustoconical configuration whose diameter decreases in the rearward direction so that the rear end surface thereof is smaller in diameter than the front end surface of the cup support 33. In this way, it is possible to effectively prevent the piston cup 36 from being forced into the clearance 35 even if the annular clearance 35 is made larger.

The front piston portion 30 has an axial width larger than the sliding stroke thereof and is formed in its outer peripheral surface with a communication passsage, i.e. a spiral oil passage 37 in the illustrated embodiment, which are normally in communication with the supply port 28 and the annular oil passage 34. The width of screw thread 38 defining the oil passage 37 is smaller then the diameter of the supply port 28 so that when the forward piston portion 30 reaches the position of the supply port 28, the supply port 28 is not closed by the screw thread 38 but can be maintained in communication with the spiral oil passage 37.

The master cylinder of the present invention further includes, similarly to the prior art, a return spring 39 for the piston 24, a stop ring 40 and a dust boot 41.

The operation of this embodiment will be described. At the fixed retracted position of the piston 24, the relief port 27 is in communication with the hydraulic chamber 26 and the supply port 28 is in communication with the annular oil passage 34, as shown in FIG. 2.

Now, when the piston 24 is moved forward, as shown by the arrow, by means of an operating lever not shown, working oil in the hydraulic chamber 26 is pressurized to actuate a hydraulic cylinder, not shown, such as a brake connected to the output port 25 in a known manner.

Subsequently, when the operating force of the operating lever is released, the piston 24 is retracted by the spring force of the return spring 39 and as a result, the outer peripheral portion of the piston cup 36 is flexed forwardly due to a pressure difference created between the hydraulic chamber 26 and the annular oil passage 34 to form a small clearance around the outer periphery thereof and therefore oil stored in the oil tank 22 is introduced into the hydraulic chamber 26 through the supply port 28, the spiral oil passage 37, the annular oil passage 34, the annular clearance 35 and the small clearance formed around the outer periphery of the piston cup 36 to supplement a reduced or consumed portion of working oil within the hydraulic chamber 26. In this case, when a surplus supply of oil is done, such a surplus portion is returned to the oil tank 22 through the relief port 27 when the piston 24 is restored to its fixed retracted position.

Figure 3:
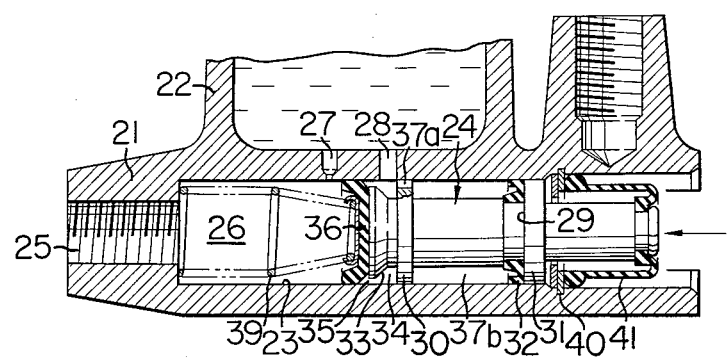
FIGS. 3 and 4 are respectively lingitudinal sectional side views of essential portions, respectively, of a second and a third embodiment of the master cylinder in accordance with the present invention.

FIG. 3 shows a second embodiment of the present invention. In this embodiment, the forward piston portion 30 is formed to have a smaller axial width than the diameter of the supply port 28 and in place of the spiral oil passage 37 in the first embodiment there is provided a notched groove 37a in the outer peripheral surface of the forward piston portion 30, and a wide annular communication passage 37b in communication with the notched groove 37a is formed at the back thereof. In this embodiment, elements other than those just mentioned above are identical to those of the first embodiment and hence designated by the same reference numerals as in the first embodiment. Thus, when working oil is supplied to the hydraulic chamber 26, the notched groove 37a and communication passage 37b serves to introduce the working oil from the supply port 28 to the annular oil passage 34 in a manner similar to the aforesaid spiral oil passage 37. This embodiment has the advantage that the piston 24 has a simple shape and can be readily fabricated.

Figure 4:
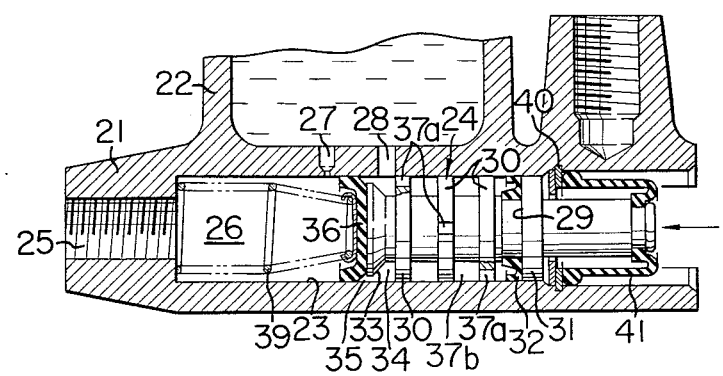

FIG. 4 shows a third embodiment of the invention, in which the forward piston portion comprises a plurality of piston members 30 which each have an axial width smaller than the diameter of a supply port 28 and are axially spaced apart from one another. Between any adjacent two of the piston members 30 there are provided annular communication passages 37b which are in communication with one another through notched grooves 37a formed in the outer peripheries of the piston members 30. The notched grooves 37a in the respective piston members 30 are offset from one another in a circumferential direction. The axially spaced apart arrangement of the plurality of the forward piston members 30 is advantageous in that the supporting surface or sliding outer peripheral surface of the forward piston is made wider to stabilize the sliding movement thereof, and the circumferentially offset arrangement of the notched grooves 37a in the forward piston members 30 is advantageous in that a radial play of the piston 24 as a whole resulting from the formation of notched grooves 37a can be minimized to further stabilize the sliding movement of the piston.

To summarize, according to the present invention, a piston slidably received in a cylinder bore to define therein a hydraulic chamber is formed with a forward piston portion and a rear piston portion axially spaced apart from each other with an annular seal member placed therebetween, the forward piston portion having an integral cup support projecting forwardly therefrom in facing relation at its outer periphery with the inner peripheral surface of the cylinder bore with an annular clearance formed therebetween; an annular passage is provided between the cup support and the forward piston portion; in the outer periphery of the forward piston portion there is provided a communication passage means which is in communication with the annular passage and a supply port connected to an oil tank; and a piston cup slidably accommodated in the hydraulic chamber is directly carried on the cup support for controlling communication between the hydraulic chamber and a relief port connected to the oil tank in accordance with the sliding movement of the piston. With this arrangement, it is possible to prevent the piston cup from being damaged during operation while ensuring a positive supply of working oil to the hydraulic chamber without employing a spacer and through apertures formed in the forward piston as in the prior art. In addition, the piston has two sliding piston portions so that sliding movement of the piston can be stabilized. Moreover, since the device is simple in construction and easy to manufacture as previously mentioned, it is possible to provide a master cylinder at low cast.

What is claimed is:

1. A master cylinder comprising a cylinder body having a cylinder bore defined therein, said cylinder bore being in communication with an oil tank through a supply port and a relief port which are formed through the wall of said cylinder bore in axially spaced apart relation from each other, a piston slidably received in said cylinder bore to define a hydraulic chamber forwardly thereof, said piston having a pair of forward and rear piston portions axially spaced from each other with an annular seal member disposed therebetween, and a cup support integrally formed with said forward piston portion forwardly thereof and having a radially outer peripheral surface facing the inner peripheral surface of said cylinder bore with an annular clearance formed therebetween, an annular passage defined between said cup support and said forward piston portion, a communication passage means formed in the outer peripheral surface of said forward piston portion and communicating with said annular passage and said supply port, and a resilient piston cup directly carried on the forward face of said cup support for controlling communication between said relief port and said hydraulic chamber in accordance with the axial sliding movement of said piston in said cylinder bore, the improvement wherein: said forward piston portion has an axial width larger than the diameter of said supply port; said communication passage means comprises a spiral passage formed in the outer peripheral surface of said forward piston portion; and said forward piston portion has a spiral land portion formed between the adjacent turns of said spiral passage, and the width of each turn of said land portion being smaller than the diameter of said supply port.

2. A master cylinder as set forth in claim 1, wherein said cup support is in the form of frustoconical configuration whose diameter increases toward said hydraulic chamber.

3. A master cylinder as set forth in claim 1, wherein said piston cup has a rear end smaller than the forward end of said cup support.

* * * * *